July 26, 1949.   D. M. JACOB   2,477,485
PULSE ECHO BEACON TRANSPONDER
Filed Nov. 12, 1943
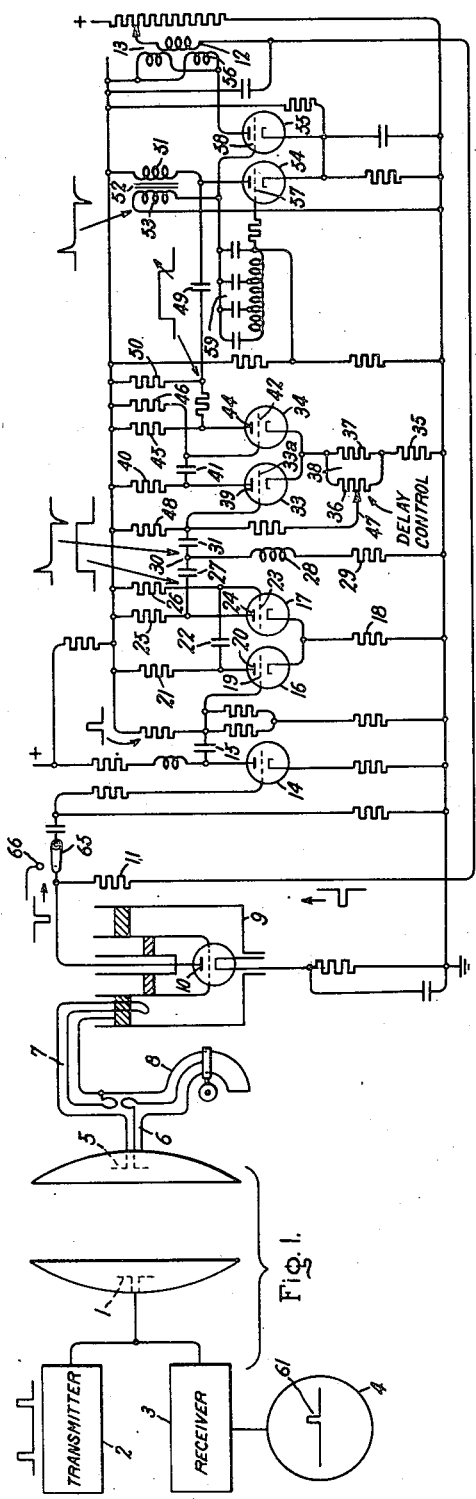
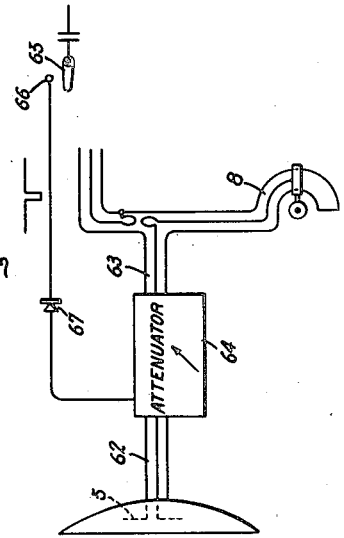
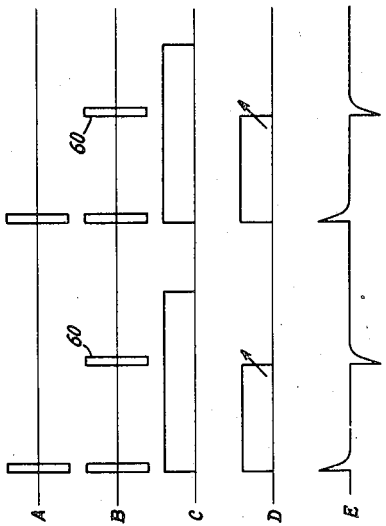
Inventor:
Don M. Jacob,
by Harry E. Dunham
His Attorney.

Patented July 26, 1949

2,477,485

UNITED STATES PATENT OFFICE 2,477,485

PULSE ECHO BEACON TRANSPONDER

Don M. Jacob, Scotia, N. Y., assignor to General Electric Company, a corporation of New York Application November 12, 1943, Serial No. 510,009

6 Claims. (Cl. 343—18)

The present invention relates to apparatus for transmitting an echo pulse at an adjustable time after the receipt of a signal. Such apparatus, which may be termed a pulse echo beacon transponder, or more simply, an echo beacon, is useful in calibrating echo ranging radio locating equipment.

An object of my invention is to provide an improved echo beacon in which the delay interval is accurately adjustable.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 is a circuit diagram, Fig. 2 illustrates the operation, and Fig. 3 is a modification for use in the circuit of Fig. 1.

Referring to the drawing, there is shown an echo beacon used for calibrating radio locating equipment having an antenna 1 connected to a transmitter 2 supplying pulses of radio waves at the desired repetition rate and to a receiver 3 for echoes of the transmitted pulses. Associated with the receiver is suitable apparatus 4 for displaying the range of the objects reflecting the echo pulses. Since the range of the reflecting object determines the time of arrival of the echoes, an echo beacon is obviously useful in calibrating the range scale of the display apparatus.

The echo beacon has an antenna 5 for picking up the pulses transmitted from the antenna 1 and for transmitting echo pulses simulating reflections from an object at a range corresponding to the delay interval between the transmitted and echo pulses. The antenna is connected through transmission lines 6, 7 and a tuning stub 8 to the cathode-grid cavity of a reentrant cavity oscillator 9 tuned to the frequency of the transmitter 2. The oscillator 9 serves both as a detector for the pulses received by the antenna and as a transmitter for the echo pulses.

During reception, and also during transmission, the positive half of each pulse is rectified, causing a negative pulse to appear at the anode 10 which is connected to the power supply through a resistance 11 and the secondary 12 of a transformer 13. This negative pulse is amplified in a resistance coupled amplifier 14 and appears as a positive pulse in the amplifier output. The amplifier output is applied through a condenser 15 to a long delay multivibrator comprising discharge devices 16 and 17, the device 17 being normally conducting and the device 16 being biased to cut-off by the current flowing in the common cathode resistor 18. The positive pulse from the amplifier 14, when applied to the grid 19 of the device 16, causes the device 16 to conduct with the result that the voltage at the anode 20 drops due to the current flowing through the resistance 21. The voltage at the anode 20 is applied through a condenser 22 to the grid 23 of the device 17, driving the device 17 to cut-off and causing an increase in the voltage at the anode 24 due to the interruption of the current through the resistance 25. The device 16 continues to conduct (and the device 17 remains cut off) until the condenser 22 discharges through resistance 26 to an extent sufficient to start the flow of current through the device 17. At this time the voltage at the anode 24 suddenly drops due to the flow of current through the resistance 25 and the device 16 is biased to cut-off by the flow of current through the cathode resistor 18. The condenser 22 and the resistance 26 are proportioned so that the interval during which the device 17 is cut off is longer than any interval during which an echo pulse can be transmitted from the oscillator 9. While the device 17 is cut off, a positive pulse supplied to the grid 19 will have no effect since the device 16 is conducting when the device 17 is cut off.

The voltage at the anode 24 is fed through a differentiating circuit consisting of a condenser 27, an inductance 28, and a resistance 29. The addition of the inductance 28 to the condenser 27 and resistance 29, which comprise the conventional differentiating circuit, increases the rate at which the voltage at terminal 30 can rise and results in sharper positive and negative pulses at the leading and trailing ends of the voltage pulse appearing at the anode 24. The wave shape of the voltage at the terminal 30 is indicated directly above the wave shape of the voltage appearing at the anode 24. The voltage at the terminal 30 is applied through a condenser 31 to a variable delay multivibrator comprising discharge devices 33 and 34, the device 34 being normally conducting and the device 33 being biased to cut-off by the current flowing through arm 36 of potentiometer 38. Upon the appearance of the positive pulse at the grid 33a of the device 33 (substantially coincident with the positive pulse at the output of amplifier 14) the device 33 becomes conducting and the voltage at its anode 39 suddenly drops due to the current flowing through resistance 40. This sudden drop in voltage is supplied through a condenser 41 to the grid 42 of the device 34 biasing it to cut-off and causing a sudden rise in the potential at its anode 44 due to the interruption of current in the resistance 45. The device 34 remains cut off for an interval determined by the drop in potential at the anode 39 and the time required for the condenser 41 to discharge through a resistance 46 to a value sufficient to start the flow of current through the device 34. The drop in potential at the anode 39 is adjustable by a slider 47 on the arm 36 of the potentiometer 38. The position of the slider determines the bias of the grid which in turn determines the value of current through the resistance 40. The interval during which the device 34 remains cut off (the delay) can be varied from 2 microseconds up to something less than the delay of the preceding fixed delay of the vibrator 16, 17. This results in a positive square wave pulse at the anode 44 having a width adjustable by the setting of the slider 47.

The adjustment of the delay is made substantially independent of variations in the voltage supply by means of a resistance 48 connected from the positive side of the voltage supply to the grid 33a and by the connection of the potentiometer 38 in series with the cathode resistor 35. The connection of the potentiometer in series with the cathode resistor tends to increase the bias on grid 33a faster than the increase in the supply voltage with the result that with increasing supply voltage the grid 42 is driven more positive and the delay increases. The addition of the compensating resistance 48 has the opposite effect on the bias of grid 33a, tending to decrease the delay with increasing supply voltage. The combination of the two effects compensates for non-linearity of the device 33 and makes the delay independent of the voltage supply which may be unregulated. Since regulated voltage supplies are subject to changes from day to day, the compensation is useful even with a regulated voltage supply.

The output of the adjustable delay multivibrator, which appears at the anode 44, consists of a square wave voltage (the delay pulse) having a duration determined by the setting of the slider 47 and having its leading edge triggered by the leading edge of the output of the preceding fixed delay multivibrator.

The output of the adjustable delay multivibrator is connected to a condenser 49, opposite terminals of which are connected to the high side of the power supply through a resistance 50 and the primary 51 of a transformer 52. These elements serve as a differentiating circuit causing positive and negative pulses in the transformer primary 51 respectively at the leading and trailing ends of the multivibrator output voltage. The transformer 52 is connected to a regenerative pulser comprising a discharge device 54 in series with the primary 51 and a discharge device 55 in series with the primary 56 of the transformer 13. The positive pulse at the leading end of the multivibrator output voltage is applied through the secondary 53 to grids 57 and 58 driving the grids from cut off to a more negative bias. The negative pulse at the trailing end of the multivibrator output voltage drives the grids 57 and 58 positive causing a flow of current through the primary 51 which induces a voltage in the secondary 53 increasing the positive bias on the grids 57 and 58. The flow of current through the device 54 is regenerative in that an increase in the current increases the positive grid bias and causes a further increase in current. As a result of this action, the devices 54 and 55 are rapidly driven to saturation. The induced voltage in the secondary 53 is applied to an artificial transmission line 59 for providing a time delay equal to the desired pulse width of the pulser. The traveling voltage wave on the transmission line starts down the line coincident with the application of the positive voltage to the grids 57 and 58 and upon reaching the open end of the line (the end remote from the grids 57, 58) is reflected with the same sign and upon arrival at the grids 57 and 58 biases the grids far beyond cut-off and abruptly terminates the flow of current through the devices 54, 55. In the operation of the pulser, the current through the devices 54, 55 starts at zero, abruptly increases to saturation, and continues at saturation for the length of time required for the voltage wave to travel twice the length of the transmission line 59 and abruptly returns to zero. The length of the current pulse (1 microsecond in the present equipment) is controlled by the length of the transmission line. The current pulse through the device 55 flows through the primary 56 of the transformer 13 and causes a corresponding positive voltage pulse in the secondary 12 which is connected to the anode 10 of the oscillator 9. The oscillator 9 oscillates for the duration of the voltage pulse transmitting a simulated echo over the antenna 5 which is picked up by the antenna 1 and presented on the display 4 at a position corresponding to the delay. The oscillation of the oscillator 9 is also fed through the amplifier 14 to the grid 19 of the fixed delay multivibrator device 16, but since the device is conducting there is no change due to the echo pulse. The fixed delay multivibrator prevents regeneration of the simulated echo pulse.

In the use of the equipment the transmitted pulses of the radio locating equipment, indicated at line A, Fig. 2, are picked up by the antenna 5 of the echo beacon and are conducted to the cathode-grid cavity of the oscillator 9. The echo beacon is usually located beside the locating equipment so that the pulses transmitted from the locating equipment appear substantially simultaneously in the cathode-grid cavity of the oscillator 9. The envelope of the oscillations in the cathode-grid cavity is shown in line B of Fig. 2. The upper half of the envelope is rectified in the oscillator and applied through an amplifier 14 to the fixed long delay multivibrator, causing firing of the multivibrator so as to produce the square wave voltage at the anode 24, indicated at line C in Fig. 2. The leading end of the output voltage of the fixed delay multivibrator is applied through a differentiating circuit 27, 28, 29 producing a positive pulse voltage which fires the variable delay multivibrator. At the output of the variable delay multivibrator appears the square wave voltage indicated at line D in Fig. 2 having a length determined by the adjustment of the slider 47 varying from two microseconds to something less than the length of the fixed delay multivibrator output. The variable delay multivibrator output is applied to the pulse transformer 52 producing a positive pulse at the leading end and a negative pulse at the trailing end, indicated at line E in Fig. 2. The negative pulse fires a pulser 54—59 applying a one-microsecond pulse through the transformer 13 to the anode 10 of the oscillator 9. This causes the echo oscillations indicated at 60 in line B of Fig. 2. The echo oscillations are transmitted to the locating equipment producing a mark 61 on the range scale of the display apparatus 4 at a point corresponding to the delay of the echo pulse. Since the range of remote objects is determined by the time of travel from the locating equipment to and from the reflecting object, the echo pulse of the echo beacon simulates the echo from a remote object and provides a convenient method of checking the calibration of the range scale of the locating equipment. During the transmission of the echo pulses the oscillations 60 appearing in the cathode-grid cavity of the oscillator 9 are rectified and fed through the amplifier 14 to the fixed delay multivibrator. However, this can have no effect since the echo pulses always arrive after the multivibrator has been fired. The use of the fixed delay multivibrator ahead of the variable delay multivibrator prevents regeneration of the echo pulses which would otherwise result in the transmission of repeated echoes.

In Fig. 3 is shown a modification for use in the circuit of Fig. 1, corresponding parts being indicated by the same reference numerals. In this modification, the transmission line 6 leading to the antenna 5 is replaced by transmission lines 62, 63 and an attenuator 64, and a switch 65 in the input circuit of amplifier 14 is moved from the position shown in Fig. 1 to a contact 66 connected to a crystal detector 67 fed from the end of the attenuator connected to the transmission line 62. The balance of the Fig. 1 circuit is unchanged.

In the operation, the signal picked up by the antenna 5 is fed through the crystal 67 (instead of through the oscillator 9 as in Fig. 1) to the amplifier 14. The echo pulse from the oscillator 9 is fed through the attenuator 64 to the antenna 5 which reduces the intensity of the echo pulse to permit signal to noise measurements on the receiver 3. The echo pulse is also fed through the crystal 67, but has no effect since the delay multivibrator 16, 17 is not in condition for firing. It will be noted that the attenuator 64 does not attenuate the received pulse and accordingly does not interfere with the operation of the echo pulse circuit. If the attenuator were merely inserted in the transmission line 6 of Fig. 1 without making other changes, the received pulse might be attenuated to a point at which it would not fire the delay multivibrator 16, 17 and the echo pulse would not be retransmitted.

While I have shown particular embodiments of my invention, it will be understood that many modifications may be made without departing from the spirit thereof, and I contemplate by the appended claims to cover any such modifications as fall within the true spirit and scope of my invention.

What I claim as new and desire to secure by Letters Patent of the United States is:

1. An echo beacon comprising a transceiver, a long delay multivibrator having its input connected to the transceiver so as to be fired by the receipt of radio waves, a variable shorter delay multivibrator having its input connected to the output of the first multivibrator so as to be fired by the leading end of the first multivibrator output whereby the variable delay multivibrator will be fired only once during the delay interval of the first multivibrator, and a pulser having its input connected to the output of the variable delay multivibrator so as to be fired by the trailing end of the variable delay multivibrator output, the pulser output being connected to the transceiver so as to excite the transceiver to transmit a simulated echo pulse of radio waves.

2. An echo beacon comprising an oscillator arranged to detect and transmit radio waves, a long delay multivibrator adapted when fired to produce a pulse of predetermined duration, means responsive to detection of radio waves to fire said long delay multivibrator, a variable shorter delay multivibrator adapted when fired to produce a pulse of variable length, means responsive to the leading end of the pulse produced by said first multivibrator to fire said variable shorter delay multivibrator, and means excited by the trailing end of the pulse produced by said variable delay multivibrator for pulsing the oscillator so as to cause transmission of a simulated echo pulse of radio waves after a delay interval determined by the adjustment of the variable delay multivibrator.

3. The combination, in an echo beacon, of an antenna circuit, transmitting and receiving means connected to said circuit whereby the receiving means responds to signals received in or transmitted by said antenna circuit, a pulser for said transmitting means, a pair of multivibrators connected in cascade between said receiving means and said pulser, the first multivibrator including means responsive to a pulse received by said receiving means to generate a pulse having a fixed period irrespective of any pulses received in said receiving means during said fixed period, the second multivibrator including means responsive to initiation of the pulse produced by the first multivibrator to produce a pulse of variable duration, and means responsive to termination of said pulse of variable duration to excite said pulser thereby to transmit a pulse through said antenna, whereby said first multivibrator operates to prevent said transmitted pulse from effecting said second multivibrator and pulser.

4. In a system for artificially transmitting echoes of received pulses, a simulated echo pulse being transmitted at a variable time after reception of the previously received pulse, said system comprising a pulse transmitter and receiver, and said receiver being responsive to pulses transmitted by said transmitter, the combination of means responsive to a pulse received in said receiver to produce a pulse in said transmitter upon elapse of a variable time after receipt of said pulse in said receiver, means to prevent operation of said last means in response to any pulse produced in said transmitter in response to its own actuation, said preventing means comprising a multivibrator connected in circuit between said receiver and said pulse responsive means, said multivibrator including means responsive to a pulse received in said receiver to produce a pulse of fixed duration irrespective of any subsequent pulses received in said receiver, and means to supply said pulse of fixed duration to said pulse responsive means.

5. In combination, an antenna by which signal pulses are both transmitted and received, a transmitter connected to said antenna, means to pulse said transmitter thereby to supply pulses to said antenna for transmission thereby, a pulse-responsive circuit self operable from a normally receptive condition into a non-receptive condition in response to a pulse received in said antenna and provided to said circuit to generate an actuating pulse for said pulsing means after elapse of a predetermined time interval, said circuit comprising means for maintaining said circuit in said non-receptive condition for a period not less than said interval.

6. In a system for artificially transmitting echoes of received pulses, a simulated echo pulse being transmitted at a variable time after reception of the previously received pulse, said system comprising a pulse transmitter and receiver, and said receiver being responsive to pulses transmitted by said transmitter, the combination of means actuated upon receipt of and by a pulse received in said receiver to produce a pulse in said transmitter upon elapse of a variable time after receipt of said pulse in said receiver, and time delay means interposed between said receiver and said pulse responsive means operative after actuation of said pulse responsive means by said received pulse to prevent the pulsing of said pulse responsive means during a time interval following said received pulse of not less than said variable time.

DON M. JACOB.

REFERENCES CITED

The following references are of record in the file of this patent:

UNITED STATES PATENTS

| Number | Name | Date |
|---|---|---|
| 2,134,716 | Gunn | Nov. 1, 1938 |
| 2,189,549 | Hershberger | Feb. 6, 1940 |
| 2,208,422 | Hugon | July 16, 1940 |
| 2,378,939 | Nicolson | June 26, 1945 |
| 2,403,527 | Hershberger | July 9, 1946 |
| 2,408,048 | Deloraine et al. | Sept. 24, 1946 |
| 2,416,089 | Jones | Feb. 18, 1947 |
| 2,416,895 | Bartelink | Mar. 4, 1947 |
| 2,421,016 | Deloraine et al. | May 27, 1947 |

FOREIGN PATENTS

| Number | Country | Date |
|---|---|---|
| 474,690 | Great Britain | Nov. 5, 1937 |